(12) United States Patent
Shynar et al.

(10) Patent No.: US 8,983,228 B1
(45) Date of Patent: Mar. 17, 2015

(54) SYSTEMS AND METHODS FOR AUTOMATICALLY ADJUSTING THE TEMPORAL CREATION DATA ASSOCIATED WITH IMAGE FILES

(75) Inventors: Michael Shynar, Tel Aviv (IL); Asaf Zomet, Jerusalem (IL); Gal Chechik, Los Altos, CA (US)

(73) Assignee: Google Inc., Mountain View, CA (US)

( * ) Notice: Subject to any disclaimer, the term of this patent is extended or adjusted under 35 U.S.C. 154(b) by 377 days.

(21) Appl. No.: 13/484,407

(22) Filed: May 31, 2012

(51) Int. Cl.
*G06K 9/36* (2006.01)

(52) U.S. Cl.
USPC .................................................. 382/276

(58) Field of Classification Search
USPC .......................................................... 382/276
See application file for complete search history.

(56) References Cited

U.S. PATENT DOCUMENTS

| | | | |
|---|---|---|---|
| 6,904,160 B2 | 6/2005 | Burgess | |
| 6,965,801 B2 * | 11/2005 | Hall | 700/66 |
| 7,146,063 B2 | 12/2006 | Seaman et al. | |
| 7,250,861 B2 * | 7/2007 | Yukawa et al. | 340/541 |
| 8,417,000 B1 | 4/2013 | Mendis | |
| 8,760,072 B2 * | 6/2014 | Josefowicz et al. | 315/247 |
| 2004/0190379 A1 | 9/2004 | Akiba | |
| 2005/0104976 A1 | 5/2005 | Currans | |
| 2005/0110880 A1 | 5/2005 | Parulski et al. | |
| 2005/0151849 A1 | 7/2005 | Fitzhugh et al. | |
| 2006/0200475 A1 | 9/2006 | Das et al. | |
| 2007/0089060 A1 | 4/2007 | Shirasaka | |
| 2008/0125996 A1 | 5/2008 | Fitzhugh | |
| 2009/0136159 A1 * | 5/2009 | Guan | 382/311 |
| 2010/0153184 A1 * | 6/2010 | Caffrey et al. | 705/10 |
| 2010/0289921 A1 | 11/2010 | Napoli et al. | |

OTHER PUBLICATIONS

Where was that photo taken? Deriving geographical information from image collections based on temporal exposure attributes, Frode Eika Sandnes, Multimedia Systems (2010) 16:309-318, Published online: May 14, 2010.*
Forsythe et al., "A model comparison for daylength as a function of latitude and day of year", Ecological Modelling 80 (1995) 87-95.*
Serrano et al., "A Computationally Efficient Approach to Indoor/Outdoor Scene Classification", Proceedings of 16th International Conference on Pattern Recognition, Quebec City Aug. 11-15, 2002, pp. 146-149.

* cited by examiner

*Primary Examiner* — Michelle Entezari
(74) *Attorney, Agent, or Firm* — Dority & Manning, P.A.

(57) ABSTRACT

In one aspect, a method for automatically adjusting temporal creation data for a plurality of images is disclosed. The method may generally include receiving a plurality of image files associated with the plurality of images, wherein each of the plurality of image files includes an initial creation time. In addition, the method may include determining a baseline creation time by analyzing the plurality of image files based on their association with at least one of daytime hours or nighttime hours and adjusting the initial creation time for at least one of the plurality of image files based on the baseline creation time.

20 Claims, 4 Drawing Sheets

SYSTEMS AND METHODS FOR AUTOMATICALLY ADJUSTING THE TEMPORAL CREATION DATA ASSOCIATED WITH IMAGE FILES

FIELD

The present subject matter relates generally to image files generated by an image capture device and, more particularly, to systems and methods for automatically adjusting the temporal creation data associated with such image files.

BACKGROUND

When capturing images with a digital camera, the camera generates an image file associated with each image. Typically, each image file includes metadata containing various types of information, such as information related to the model and/or serial number of the camera and/or information related to the camera settings. In addition, the metadata typically includes temporal creation data corresponding to the time and/or date at which the image was captured, which is provided by an internal timing mechanism or clock of the camera. For example, when an image is captured, the associated image file is typically time-stamped with the current time and/or date provided by the internal clock.

However, it is often the case that the internal clock of a camera is never set, is improperly set or is accidentally reset. As a result, the temporal creation data assigned to the image files may be incorrect and, thus, may not accurately reflect the actual times and/or dates at which the image files were created. These inaccuracies can make it difficult or even impossible to organize such image files into timelines and/or specific time periods within a local photo album application or a web-based photo service (e.g., Picasa Web Album).

SUMMARY

Aspects and advantages of the invention will be set forth in part in the following description, or may be obvious from the description, or may be learned through practice of the invention.

In one aspect, the present subject matter is directed to a method for automatically adjusting the initial creation times for a plurality of images. The method may generally include receiving a plurality of image files associated with the plurality of images, wherein each of the image files includes an initial creation time. In addition, the method may include determining a baseline creation time by analyzing the plurality of image files based on their association with at least one of daytime hours or nighttime hours and adjusting the initial creation time for at least one of the plurality of image files based on the baseline creation time.

In another aspect, the present subject matter is directed to a method for automatically adjusting the initial creation dates for a plurality of images. The method may generally include receiving a plurality of image files associated with the plurality of images, wherein each of the image files includes an initial creation date. In addition, the method may include sorting the image files into a plurality of creation day groups based on the initial creation date of each of the image files, analyzing the image files associated with the creation day groups to obtain daytime length information for each of the creation day groups, determining a baseline creation date based on the daytime length information and adjusting the initial creation date of at least one of the image files based on the baseline creation date.

Other exemplary aspects of the present subject matter are directed to systems apparatus, computer-readable media, devices and/or other methods for automatically adjusting temporal creation data for a plurality of images.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for automatically adjusting temporal creation data, such as creation times and/or creation dates, for a plurality of images. In particular, the present subject matter may be utilized to automatically correct the temporal creation data associated with image files generated by an image capture device, such as a digital camera, that includes an internal clock that has not been properly set. In several embodiments, the actual photo content of the image files and/or the metadata associated with the image files may be analyzed to approximate the actual time and/or date at which one or more of the image files were created. Such an approximation may then allow for an adjustment or offset value to be calculated that correlates the initial creation times and/or dates assigned to the image files by the image capture device to the actual times and/or dates at which such image files were created.

Figure 1:
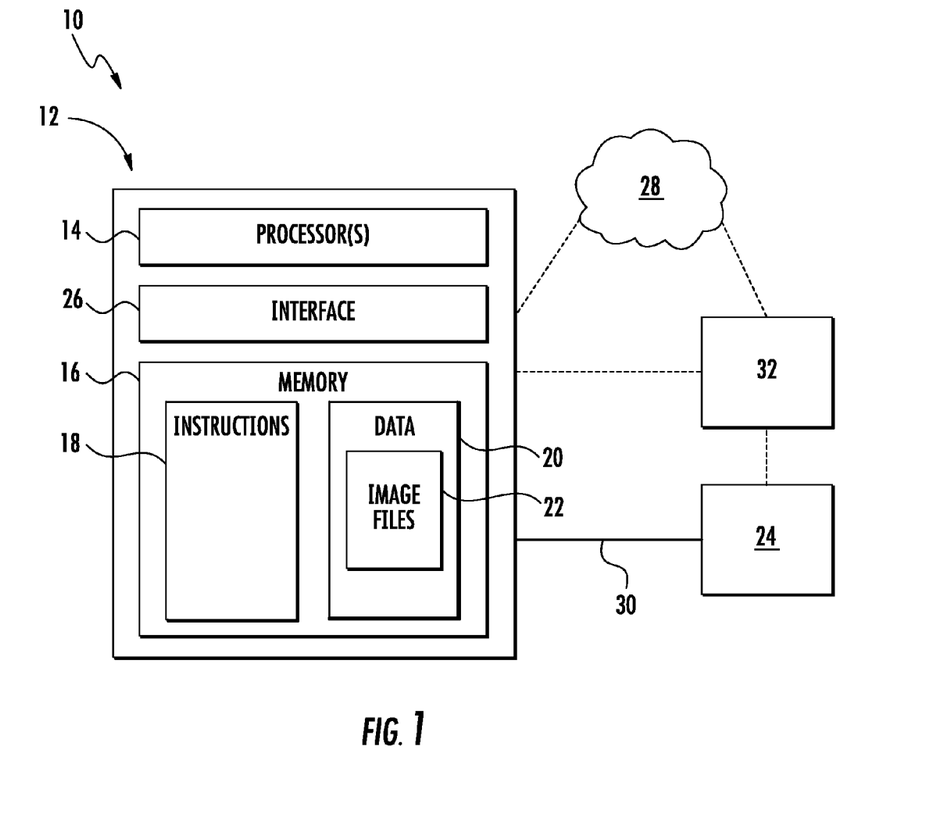
FIG. 1 illustrates a schematic view of one embodiment of a system for automatically adjusting temporal creation data for a plurality of images.

Referring now to the drawings, FIG. 1 illustrates a schematic diagram of one embodiment of a system 10 for automatically adjusting temporal creation data for a plurality of images. As shown, the system 10 may include a computing device 12 configured to receive a plurality of image files. In general, the computing device 12 may be any suitable processor-based computing device. For example, suitable computing devices may include personal computers, mobile phones (including smart phones), personal digital assistants, tablets, laptops, desktops, workstations, game consoles, servers, other computers and/or any other suitable computing devices.

As shown in FIG. 1, the computing device 12 may include one or more processors 14 and associated memory 16. The processor(s) 14 may generally be any suitable processing device(s) known in the art. Similarly, the memory 16 may generally be any suitable computer-readable medium or media, including, but not limited to, RAM, ROM, hard drives, flash drives, or other memory devices. As is generally understood, the memory 18 may be configured to store information accessible by the processor(s), including instructions 18 that can be executed by processor(s) 14. The instructions 18 may be any set of instructions that when executed by the processor(s) 14, cause the processor(s) 14 to provide desired functionality. For instance, the instructions can be software instructions rendered in a computer-readable form. When software is used, any suitable programming, scripting, or other type of language or combinations of languages may be used to implement the teachings contained herein. Alternatively, the instructions can be implemented by hard-wired logic or other circuitry, including, but not limited to application-specific circuits. The memory 18 may also include data 20 that may be retrieved, manipulated, or stored by the processor(s) 14. For instance, as will be described below, the memory 18 may store image files 22 generated by an image capture device 24.

The computing device may also include a network interface 26 for accessing information over a network 28. The network 28 may include a combination of networks, such as cellular network, WiFi network, LAN, WAN, the Internet, and/or other suitable network and can include any number of wired or wireless communication links.

In several embodiments, the computing device 12 may be configured to receive a plurality of image files 22 associated with images (e.g., digital photographs) captured by an image capture device 24, such as a digital camera or any other suitable camera. Specifically, in one embodiment, the computing device 12 may be configured to receive the image files 22 directly from the image capture device 24. For instance, images may be initially captured by the image capture device 24 and subsequently transmitted to the computing device 12 as image files via a wired or wireless connection, such as by using a communicative cable 30 (e.g., a USB cable) to transmit the image files 22 from the image capture device 24 to the computing device 12. Alternatively, the image capture device 24 may form all or part of the computing device 12 (e.g., by being configured as the camera of a mobile phone, tablet and/or laptop) such that image files 22 may be transmitted directly to the computing device 12 by transmitting such files from the image capture device 24 to another component of the computing device 12 (e.g., the processor(s) 14 and/or memory 16). In another embodiment, the computing device 12 may be configured to receive the image files 22 from the image capture device 24 via a second computing device 32. For instance, image files 22 from the image capture device 24 may be initially transmitted to and/or stored on the second computing device 32 and subsequently transmitted to the computing device 12 via a wired or wireless connection (e.g., via network 28). This may be the case, for example, if the computing device 12 is a server configured to provide instructions or data to a plurality of client computing devices, such as the second computing device 32. For instance, in a particular embodiment of the present subject matter, the computing device 12 may be a web server, such as the server associated with Picasa Web Albums, that allows for the online storage and sharing of image files 22.

As is generally understood, image files 22 may contain various types of data. For instance, image files 22 may include metadata (e.g., Exchangeable Image File (EXIF) data) that is generated by the image capture device 24 each time an image is captured. Typically, the metadata includes specific information about each image, such as information identifying the image capture device 24 that created the image (e.g., by including the serial and/or model number of the camera that captured the image), information related to various image capture parameters (e.g., shutter speed, exposure time, exposure compensation, aperture value, what metering system was used, if a flash was used, etc.) and/or various other types of relevant information. Of particular relevance to the present subject matter, the metadata generated by the image capture device 24 may also include temporal creation data related to the time and date at which a particular image was captured. Thus, when an image is captured by an image capture device 24, the image file 22 associated with such image may be time-stamped with a creation time and a creation date corresponding to the current time and date of the internal timing mechanism or clock of the image capture device 24. However, as indicated above, when the internal clock of an image capture device 24 is never set, is improperly set or is reset, the creation times and/or dates associated with each image file 22 may be inaccurate. These inaccuracies can make it difficult or even impossible to organize such image files 22 into timelines and/or specific time periods within a local photo album application or a web-based photo service (e.g., Picasa Web Album). Accordingly, in several embodiments, the computing device 12 may be configured to implement the various methods described below with reference to FIGS. 2-4 in order to automatically adjust the temporal creation data of the image files 22 received by such device 12.

Figure 2:
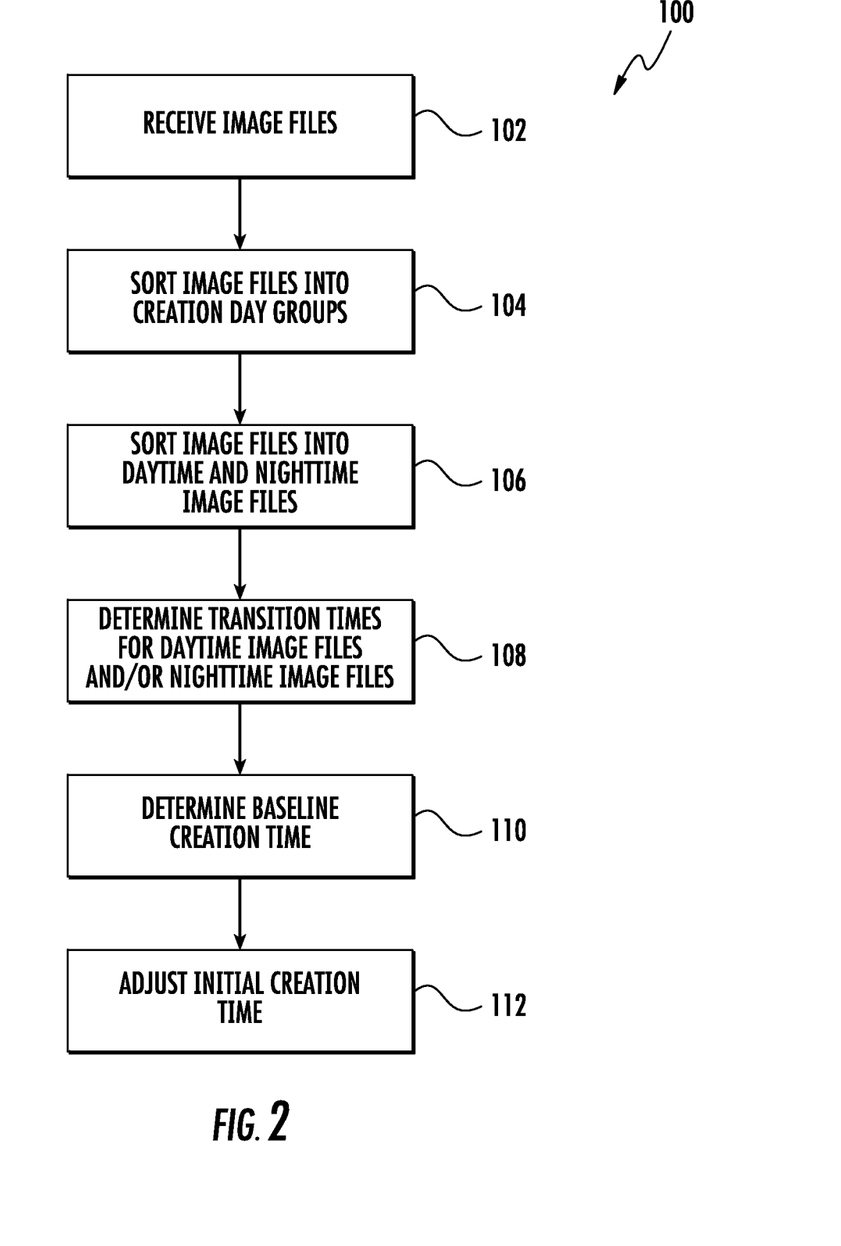
FIG. 2 illustrates a flow diagram of one embodiment of a method for automatically adjusting an initial creation time for a plurality of images.

Referring now to FIG. 2, one embodiment of a method 100 for automatically adjusting the temporal creation data for a plurality of images is illustrated in accordance with aspects of the present subject matter. Specifically, FIG. 2 illustrates a method 100 for automatically adjusting the initial creation times of a plurality of image files. In general, the method 100 will be described below with reference to being implemented by the computing device 12 of FIG. 1. However, it should be readily appreciated by those of ordinary skill in the art that the disclosed method 100 may be performed by any other suitable computing device.

At 102, the computing device 12 may receive a plurality of image files associated with images captured by a single image capture device (e.g., image capture device 24 (FIG. 1)). For example, the image files may correspond to images captured by the image capture device over a period of time (e.g., days, weeks, months or years). As indicated above, each image file may include temporal creation data corresponding to the current time and date of the internal clock of the image capture device at the time the image file was created. Specifically, each image file may include an initial creation time and an initial creation date assigned by the image capture device. For purposes of describing the disclosed method 100, it will be assumed that, at the very least, the initial creation time is incorrect and, thus, does not accurately reflect the actual time at which the image was captured.

After receiving the image files, the computing device 12 may be configured to sort or classify the image files. For example, at 104, the computing device 12 may be configured to sort the image files into one or more creation day groups based on the initial creation dates associated with the image files. As used herein, a "creation day group" may generally correspond to a group of image files that, based on their initial creation dates, were each created within a particular time period. For instance, in one embodiment, the creation day groups may be created on a day-to-day basis such that each creation day group only includes image files with the same initial creation date. In other embodiments, the creation day groups may span over a longer time period (e.g., several days, a week(s), a month(s), etc.) such that each creation day group includes image files having initial creation dates falling within such time period. For example, in a particular embodiment of the present subject matter, the creation day groups may be created on a week-to-week basis (e.g., by grouping image files having initial creation dates falling within the week spanning from June 1 to June 7 in a different creation day group from the image files having initial creation dates falling within the week spanning from June 8 to June 14).

It should be readily appreciated by those of ordinary skill in the art that the particular time period selected for sorting the image files into creation day groups may generally vary depending on the amount of image files received by the computing device 12. For example, if a large number of image files are available to the computing device 12, the image files may be sorted based on a relatively short time period (e.g., a day or several days). Alternatively, if a small number of image files are available to the computing device 12, the image files may be sorted based on a longer time period (e.g., a week(s) or a month(s)).

Additionally, at 106, the computing device 12 may also be configured to sort the image files based on their association with daytime and nighttime hours. Specifically, in several embodiments, the computing device 12 may be provided with suitable computer-readable instructions that, when implemented by the processors, configure the computing device 12 to analyze the photo content of the image files in order to classify the image files as either daytime image files or nighttime image files. For example, in one embodiment, the computing device 12 may be configured to initially analyze the photo content of each image file to determine if the image associated with such image file depicts an indoor scene or an outdoor scene. The computing device 12 may then further analyze the photo content of the image files depicting outdoor scenes in order to classify such image files as either daytime image files or nighttime image files.

It should be appreciated that the computing device 12 may be configured to analyze the photo content of the image files using any suitable image processing algorithm and/or technique known in the art. Specifically, various image processing techniques are known for sorting image files based on indoor/outdoor scene classification. For instance, many techniques utilize classifier engines to identify low-level features, such as color and texture, to infer indoor/outdoor scene information about an image. These techniques may, for example, analyze texture features of an image by identifying variances in local color contrast to classify such image as depicting an indoor or outdoor scene, such as by classifying images having more texture in the lower-half of the image than the upper-half as indoor images and vice versa. Other known techniques may combine low-level feature identification with semantic feature identification to infer indoor/outdoor scene information about an image. For instance, it is known to utilize a Bayesian network to combine color and texture features with various semantic features, such as sky, grass and tree features, to classify indoor/outdoor images. Additionally, similar image processing techniques are also known for sorting outdoor image files into daytime and nighttime classifications. For instance, known techniques utilize low level feature sets, such as color histograms (e.g., CIELUV histograms), color moments and texture, to identify daytime and nighttime distinctions, such as by analyzing the average brightness values of the pixels located in specific areas of the images. Such techniques may, for example, classify images based on the average pixel brightness between the upper and lower halves of the images (e.g., daytime images may have a brighter upper-half whereas nighttime images may have a brighter lower-half). These techniques may also classify images based on color prominence in specific areas of the images. For instance, daytime images may include a significant number of blue pixels in their upper-half, nighttime images may include a significant number of black pixels in their upper-half and images depicting the transitions from daytime to nighttime (i.e., sunset) may include a significant number of red pixels in their upper-half.

In addition, the computing device 12 may also be provided with suitable computer-readable instructions that, when implemented by the processors, configure the computing device 12 to analyze the image capture parameters associated with each image file in order to classify the image files as either daytime image files or nighttime image files. Specifically, image capture parameters, such as shutter speed, aperture value (i.e., the F number of the lens aperture), whether the flash was used and/or the like, can be utilized to determine whether an image was captured during daytime or nighttime hours. For instance, by knowing the shutter speed and the aperture value, the exposure value of an image (i.e., a term of art referring to the amount of light for a given exposure) may be determined. Typically, the exposure value is larger in brighter environments than in darker environments and, thus, may be used to discriminate between daytime and nighttime images.

It should be appreciated that the photo content and the image capture parameters of the image files may be analyzed separately or in combination in order to classify such images files as either daytime image files or nighttime image files. Specifically, in one embodiment, a classifier (e.g., a support vector machine) may be trained that utilizes both photo content and image capture parameters to classify the image files, such as by training the classifier to consider classification features including, but not limited to, colors, textures, brightness values, semantic photo content, shutter speed, aperture values and/or the like.

By sorting the image files into creation day groups and daytime/nighttime image files, in 108, transition times for one or more of the creation day groups may be determined. In general, the transition times for each creation day group may correspond to the minimum and maximum times associated with the daytime image files and/or the nighttime image files included in such creation day group. For instance, the daytime image files for a particular creation day group may include a minimum transition time (e.g., the time closest to the transition between night and day or sunrise) and a maximum transition time (e.g., the time closest to the transition between day and night or sunset). Similarly, the nighttime image files for a particular creation day group may include a minimum transition time (e.g., the time closest to the transition between day and night or sunset) and a maximum transition time (e.g., the time closest to the transition between night and day or sunrise).

In several embodiments, the transition times for a particular creation day group may be determined by analyzing the initial creation times associated with the daytime and nighttime image files included within such group. For instance, a distribution of the initial creation times for the daytime image files of a particular creation day group may be created (e.g., by organizing the daytime image files in ascending order based on the initial creation times) to determine the minimum and maximum initial creation times of such image files. The minimum and maximum transition times for the daytime image files may then be set as such minimum and maximum initial creation times, respectively, or may be set as some percentage of the range between the minimum and maximum initial creation times (e.g., by setting the minimum and maximum transition times at 10% and 90%, respectively, of the range between the minimum and maximum initial creation times). It should be appreciated that the initial creation times for the nighttime image files of a particular creation day group may be similarly analyzed to determine the minimum and maximum transition times for such image files.

Referring still to FIG. 2, in 110, the computing device 12 may be configured to utilize the transition times for the daytime image files and/or the nighttime image files of a given creation day group to determine a baseline creation time for such image files. In general, the baseline creation time may correspond to a time value that, based on the analysis of the image files, may be directly correlated to a predetermined time value stored within the computing device 12. For example, as described above, the image files may be analyzed to determine the transition times between night and day and between day and night. Thus, in several embodiments, the baseline creation time may be a calculated time value (based on the initial creation times provided by the image capture device) that corresponds to a mid-day time between sunrise and sunset. In such embodiments, the baseline creation time may be set by determining the midpoint between the transition times for the daytime and nighttime image files for a particular creation day group.

For instance, in one embodiment, the computing device 12 may be configured to determine a sunrise time for a particular creation day group by averaging the minimum transition time for the group's daytime image files and the maximum transition time for the group's nighttime image files. Similarly, the computing device 12 may be configured to determine a sunset time for such creation day group by averaging the maximum transition time for the group's daytime image files and the minimum transition time for the group's nighttime image files. The sunrise time may then be averaged with the sunset time to determine the baseline creation time for the image files. It should be appreciated that the averages described above may correspond to simple averages, weighted averages and/or the like.

Alternatively, the baseline creation time may be determined based solely on the transition times for the daytime image files or the nighttime image files. For instance, in one embodiment, the minimum and maximum transition times for the daytime image files or the nighttime image files may be averaged to determine the baseline creation time.

It should be appreciated that, since the baseline creation time is determined using the initial creation times of the image files, an offset value may be calculated to adjust for the inaccuracies introduced by the internal clock of the image capture device. For example, as indicated above, the baseline creation time may, in several embodiments, correspond to a predetermined mid-day time between sunrise and sunset. Thus, an appropriate offset value may be calculated for correlating the baseline creation time to such predetermined mid-day time. For example, if the mid-day time is set within the computing device as 1:00 PM and the baseline creation time is determined to be 10:00 PM, an offset value of negative nine (−9) hours may be necessary to adjust the baseline creation time to the mid-day time.

Once the appropriate offset value for the baseline creation time has been determined, in 112, the computing device 12 may then utilize the calculated offset value to correct the initial creation times of each of the image files. In particular, the offset value may simply be applied to the initial creation times as a plus/minus adjustment. For instance, in the example above in which the calculated offset value was −9 hours, the initial creation time for each image file may be reduced by nine hours to adjust for the inaccuracies introduced by the internal clock of the image capture device. The initial creation times may then be overwritten within the metadata of the image files to indicate the adjusted creation times.

It should be appreciated that the method 100 shown in FIG. 2 has been described above with reference to analyzing image files derived from the same image capture device. Thus, although the internal clock of the image capture device may not be set to the correct time, it still provides an accurate measurement of the time difference between captured images. As such, once a baseline creation time (and its corresponding offset) is determined for any group of image files generated by an image capture device, it may be utilized to adjust all of the image files generated by such device.

It should also be appreciated that, in alternative embodiments, the computing device 12 may be configured to utilize other methods in order to adjust the initial creation times provided by an image capture device and/or to assess the accuracy of the above described method 100. For instance, in one embodiment, the computing device 12 may be configured analyze the photo content of the image files using suitable image processing algorithms and/or techniques in order to detect timing devices, such as analogue or digital clocks and/or watches, depicted in the images. In such an embodiment, the computing device 12 may then utilize the time displayed on such timing devices to adjust the initial creation times of the image files. Alternatively, the computing device 12 may utilize the time displayed on such timing devices to increase the accuracy of the adjusted creation times determined using the method 100 described above. For example, the time displayed on the timing device may provide an indication of the proper daylight savings time settings that should be applied to the adjusted creation times.

Additionally, it should be appreciated that, when the computing device 12 has been provided information regarding a user's geographic location, such information may be utilized to adjust and/or improve the accuracy of the disclosed method 100. For example, geographic information may be utilized to determine the appropriate time zone settings, daylight savings time settings and/or the like that may need to be considered when adjusting the initial creation times.

Figure 3:
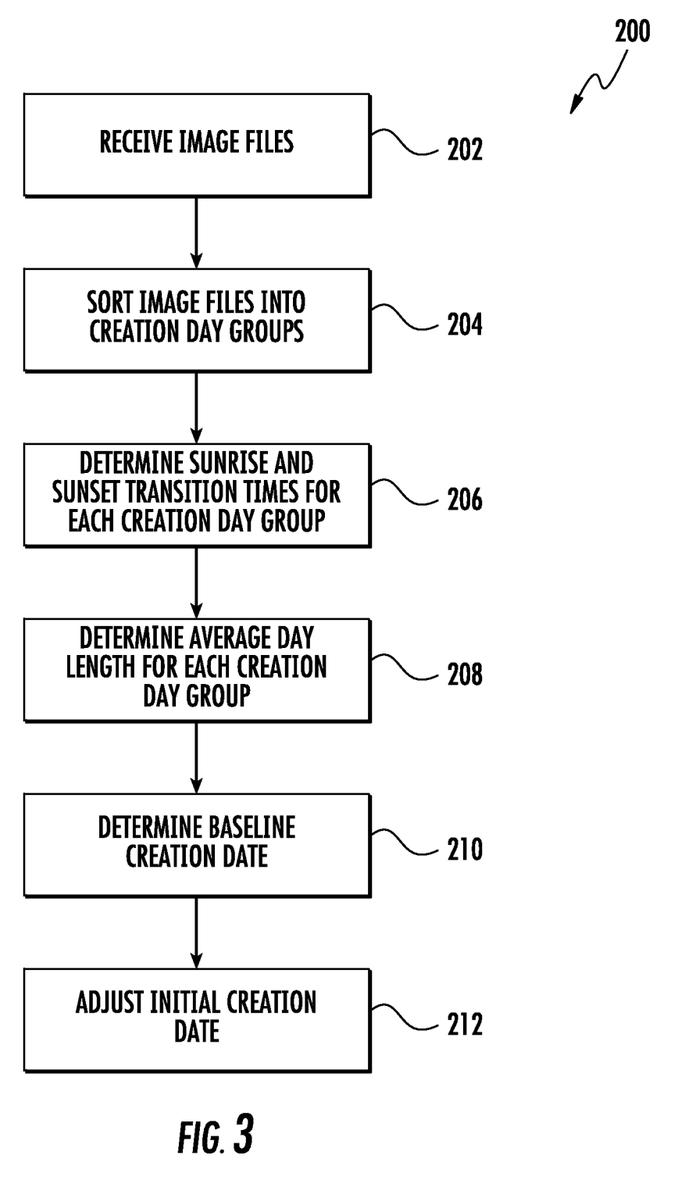
FIG. 3 illustrates a flow diagram of one embodiment of a method for automatically adjusting an initial creation date for a plurality of images.

Referring now to FIG. 3, another embodiment of a method 200 for automatically adjusting temporal creation data for a plurality of images is illustrated in accordance with aspects of the present subject matter. Specifically, FIG. 3 illustrates a method 200 for automatically adjusting the initial creation dates of a plurality of image files. In general, the method 200 will be described below with reference to being implemented by the computing device 12 of FIG. 1. However, it should be readily appreciated by those of ordinary skill in the art that the disclosed method 200 may be performed by any other suitable computing device.

At 202, the computing device 12 may receive a plurality of image files associated with images captured by a single image capture device (e.g., image capture device 24 (FIG. 1)). As indicated above, each image file may include temporal creation data (i.e., an initial creation time and an initial creation date) corresponding to the current time and date of the internal clock of the image capture device at the time the image file was created. For the purpose of describing the disclosed method 200, it will be assumed that, at the very least, each initial creation date is incorrect and, thus, does not accurately reflect the actual date at which the image was captured.

Additionally, at 204, the computing device 12 may be configured to sort the image files into a plurality of creation day groups based on the initial creation date associated with each image file. As described above with reference to FIG. 2, each creation day group may correspond to a group of image files that, based on their initial creation dates, were each created within a particular time period. For instance, the image files may be grouped on a day-to-day basis or over a longer time period (e.g., several days, a week(s), a month(s), etc.).

Moreover, at 206, the computing device 12 may be configured to determine a sunrise transition time and a sunset transition time for each creation day group. In general, the sunrise transition time for each creation day group may correspond to the approximate time at which the images included in such creation day group transition from night to day. Similarly, the sunset transition time for each creation day group may correspond to the time at which the images included in such creation day group transition from day to night.

In several embodiments, the sunrise and sunset transition times may be set as the sunrise and sunset times for each creation day group and, thus, may be determined in accordance with the disclosure provided above with reference to FIG. 2. For example, as described above, the computing device 12 may be configured to initially sort the image files for each creation day group into daytime image files and nighttime image files by analyzing the photo content and/or the image capture parameters of such image files (106 of FIG. 2). The maximum and minimum transition times for the daytime and nighttime image files may then be determined by the computing device 12 (108 of FIG. 2) and subsequently utilized to calculate the sunrise and sunset times (e.g., by averaging the appropriate transition times).

Alternatively, the sunrise and/or sunset transition times for each creation day group may simply be set as the minimum and/or maximum transition times of the daytime and/or nighttime image files. For instance, in one embodiment, the sunrise transition time for a particular creation day group may correspond to the minimum transition time for the group's daytime image files or the maximum transition time for the group's nighttime image files. Similarly, the sunset transition time for a particular creation day group may correspond to the maximum transition time for the group's daytime image files or the minimum transition time for the group's nighttime image files.

By determining the sunrise and sunset transition times for each creation day group, at 208, the average day length for each creation day group may then be calculated. Specifically, in several embodiments, the computing device 12 may be configured to subtract the sunrise transition time for a particular creation day group from the sunset transition time for such group to determine its average day length. For instance, if the sunrise transition time for a creation day group is 5:30 AM and the sunset transition time for such group is 8:30 PM, then the average day length for that particular creation day group is equal to 15 hours.

Additionally, at 210, a baseline creation date may be determined based on the average day lengths for the creation day groups. In general, the baseline creation date may correspond to a date value that, based on the analysis of the image files, may be directly correlated to a predetermined date value stored within the computing device 12. For example, as will be described below, the average day lengths for the creation day groups may be analyzed to determine which group(s) has the longest and/or shortest average day length. Thus, in several embodiments, the baseline creation date may be a calculated date value (based on the initial creation dates provided by the image capture device) that corresponds to a predetermined date value associated with the longest and/or shortest day of the calendar year.

Specifically, in one embodiment, the computing device 12 may be configured to analyze the average day lengths to determine which creation day group(s) has the longest and/or shortest average day length. The initial creation date for such creation day group(s) (or the average of the initial creation dates for such group(s) in the event the group(s) includes image files having creation dates spanning over more than one day) may then be set as the baseline creation date, which may generally correspond to the longest day of the calendar year (e.g., around June 21) and/or the shortest day of the calendar year (e.g., around December 21). Similar to the baseline creation time described above, once the baseline creation date is determined, an appropriate offset value may be calculated for correlating the baseline creation date to the longest and/or shortest day of the year. For example, if the baseline creation date (corresponding to the creation day group having the longest average day length) is determined to be April 24 and the longest day of the calendar year is set within the computing device as June 21, an offset value of negative fifty-eight (−58) days may be necessary to adjust the baseline creation date to the longest day of the year.

As an alternative to relying on the longest and/or shortest average day length to set the baseline creation date, the computing device 12 may be configured to analyze both the initial creation dates and the average day lengths of the creation day groups in order to determine the two creation day groups that have initial creation dates that are spaced generally six months apart and that have the maximum difference in average day lengths. In such an embodiment, the initial creation date (or average initial creation date) of the creation day group with the longer average day length may be assumed to be the longest day of the calendar and the initial creation date (or average initial creation date) of the creation day group with the shorter average day length may be assumed to be the shortest day of the calendar. An appropriate offset value may then be determined to allow for adjustment of such dates to the longest and shortest days of the calendar year.

It should be appreciated that, in alternative embodiments, the baseline creation date may be determined by relying on daytime length information other than average day lengths. For example, in several embodiments, the sunrise and/or sunset transition times identified in 206 may be utilized to determine the baseline creation date. Specifically, in one embodiment, the sunrise transition times may be analyzed to determine which creation day group(s) has the earliest sunrise transition time and/or the latest sunrise transition time. In such an embodiment, the initial creation date of the creation day group with the earliest or latest sunrise transition time may be assumed to be the longest or shortest day of the year. In another embodiment, the sunset transition times may be analyzed to determine which creation day group(s) has the earliest sunset transition time and/or the latest sunset transition time. The initial creation date of the creation day group with the earliest or latest sunset transition time may then be assumed to be the shortest or longest day of the year. Regardless, after determining the baseline creation date, an offset value may then be determined to allow for the adjustment of the initial creation dates of the image files.

Once the appropriate offset value for the baseline creation date has been determined, in 212, the computing device 12 may then utilize the calculated offset value to correct the initial creation date for each of the image files. In particular, the offset value may simply be applied to the initial creation dates as a plus/minus adjustment. For instance, in the example above in which the calculated offset value was −58 days, the initial creation date for each image file may be reduced by 58 days to adjust for the inaccuracies introduced by the internal clock of the image capture device. The initial creation dates may then be overwritten within the metadata of the image files to indicate the adjusted creation dates.

It should be appreciated that, similar to the method 100 described above, the disclosed method 200 has been described with reference to analyzing image files derived from the same image capture device. Thus, although the internal clock of the image capture device may not be set to the correct date, it still provides an accurate measurement of the time difference between captured images. As such, once a baseline creation date (and its corresponding offset) is determined for any group of image files generated by an image capture device, it may be utilized to adjust all of the image files generated by such device.

Additionally, it should be appreciated that, in several embodiments, the computing device 12 may be configured to analyze the photo content of the image files using suitable image processing algorithms and/or techniques in order to detect date-specific objects and/or features within the images. For example, the computing device 12 may be configured to detect Christmas trees, Hanukkah candles, green clovers (for St. Patrick's Day) and/or other date-specific objects and/or features, thereby providing the computing device 12 with information regarding the approximate creation dates of the image files containing such date-specific objects and/or features. This information may then be utilized by the computing device 12 to adjust the initial creation dates of the image files and/or to assess the accuracy of the adjusted creation dates determined using the disclosed method 200.

Figure 4:
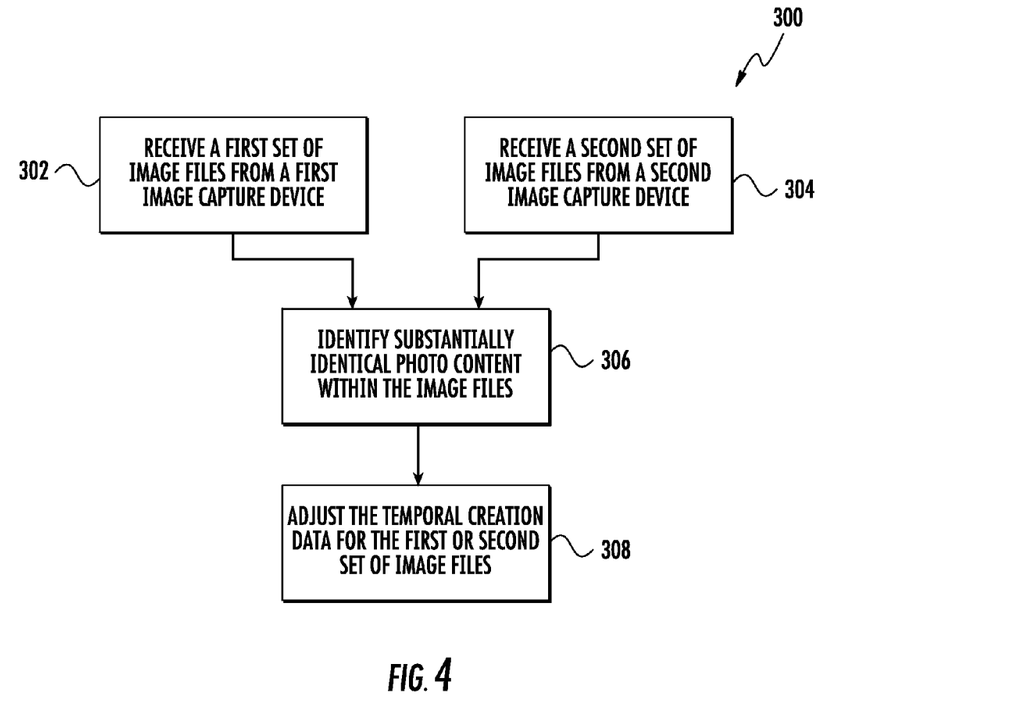
FIG. 4 illustrates a flow diagram of one embodiment of a method for automatically adjusting both an initial creation time and an initial creation date for a plurality of images.

Referring now to FIG. 4, a further embodiment of a method 300 for automatically adjusting temporal creation data for a plurality of images is illustrated in accordance with aspects of the present subject matter. In particular, FIG. 4 illustrates a method 300 for automatically adjusting both the initial creation times and the initial creation dates of a plurality of image files. In general, the method 300 will be described below with reference to being implemented by the computing device 12 of FIG. 1. However, it should be readily appreciated by those of ordinary skill in the art that the disclosed method 300 may be performed by any other suitable computing device.

As shown in FIG. 4, the computing device 12 may receive a plurality of image files associated with images captured by different image capture devices. For example, at 302, the computing device 12 may receive a first set of image files associated with images captured by a first capture device. In addition, at 304, the computing device 12 may receive a second set of image files associated with images capture by a second image capture device. As indicated above, each image file may generally include temporal creation data (i.e., an initial creation time and an initial creation date) corresponding to the current time and date of the internal clock of the respective image capture device at the time the image file was created. For the purpose of describing the disclosed method 300, it will be assumed that the initial creation times and/or dates for the first set of image files are incorrect while the initial creation times and/or dates for the second set of image files are correct. Thus, as will be described below, the initial creation times and/or dates for the second set of image files may be utilized to adjust the initial creation times and/or dates for the first set of image files.

It should be appreciated that, in several embodiments, the first set of image files and the second set of image files may be associated or linked with one another when stored within the computing device 12. For example, the image files from both devices may be stored within the same photo album of a suitable photo client running on and/or served by the computing device 12, such as a local photo album (e.g., a local album on Picasa) or a web-based album (e.g., a Picasa Web Album).

After receiving the image files, the computing device 12 may be configured to compare the first set of image files to the second set of image files. Specifically, as shown in FIG. 4, at 306, the computing device 12 may be configured to compare the photo content of the first set of image files to the photo content of the second set of image files to identify if any of the image files contain substantially identical photo content. In the event that the photo content of one or more of the image files created by the first image capture device is substantially identical to the photo content of one or more of the image files created by the second image capture device, at 308, the computing device 12 may utilize the temporal creation data associated with the image file(s) from one of the image capture devices (e.g., the second image capture device) to adjust the temporal creation data associated with the image file(s) from the other image capture device (e.g., the first image capture device).

For example, at a family gathering, family members may capture multiple images of the same event (e.g., a person blowing out the candles of a birthday cake or a group of people posing together) using two or more image capture devices (e.g., a first image capture device and a second image capture device), which may then be transmitted to a single photo album provided and/or hosted by the computing device 12. In such case, the computing device 12 may analyze the photo content of the image files to identify which of the image file(s) contain substantially identical photo content (e.g., the image files capturing the same event). The computing device 12 may then compare the temporal creation data for the identified image file(s) to determine if the temporal creation data provided by one of the image capture devices (e.g., the first image capture device) differs from the temporal creation data provided by another image capture device (e.g., the second image capture device). If so, the computing device 12 may utilize the temporal creation data from one of the image capture devices (e.g., the second image capture device) to adjust the temporal creation data of the other image capture device (e.g., the first image capture device), such as by calculating the appropriate offset value needed to adjust the temporal creation data for the other image capture device. This offset value may then be utilized to adjust each image file derived from such other image capture device.

It should be appreciated that the computing device may be configured to analyze and/or compare the photo content of the image files to identify which of the image files contain substantially identical photo content using any suitable image processing algorithm and/or technique known in the art. For example, in several embodiments, the computing device may be configured to assign a similarity score to each pair of image files based on the common features found between the image files (e.g., based on common colors, textures, semantic features, and/or the like). The computing device may then compare the similarity score to a predetermined similarity threshold to determine if the image files contain substantially identical photo content. In such an embodiment, the similarity threshold may be determined by analyzing the ranges of similarity scores that are typical in a plurality of example images depicting the same event versus a plurality of example images depicting different events. These ranges may allow for distributions of similarity scores to be set for related and non-related images, which may then be used to set the similarity threshold.

One of ordinary skill in the art should appreciate that a video may be considered as a sequence of frame or images and, thus, one or more of the image files described herein may form all or part of a video. In such an embodiment, each image file of the video may be assigned an initial creation time by adding to the initial creation time of the video (i.e., the initial creation time of the first frame or image of the video) the video length up to the specific image file (e.g., for a one hour video with an initial creation time of 1:00 PM, the initial creation time of the last image file would be 2:00 PM).

Additionally, it should be appreciated that, as indicated above, each image file may include metadata storing, among other things, information identifying the image capture device 24 that created the image associated with such image file (e.g., by including the serial and/or model number of the camera that captured the image). Thus, by analyzing such information, it can be determined which image files derive from the same image capture device 24.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method for automatically adjusting temporal creation data for a plurality of images, the method comprising:
    receiving a plurality of image files associated with the plurality of images, each of the plurality of image files including an initial creation date;
    sorting the plurality of image files into a plurality of creation day groups based on the initial creation date of each of the plurality of image files;
    analyzing the image files associated with the plurality of creation day groups to obtain daytime length information for each of the plurality of creation day groups, the daytime length information associated with a sunset transition time and a sunrise transition time for each of the plurality of creation day groups;
    analyzing the sunset and sunrise transition times to determine an average day length for each of the plurality of creation day groups;
    determining a baseline creation date based on the daytime length information by analyzing the average day length for each of the plurality of creation day groups in order to determine a baseline creation date, the analysis of the average day length comprising:
        analyzing the average day length for each of the plurality of creation day groups to determine the creation day group with the longest average day length;
        setting the initial creation date for the creation day group with the longest average day length as the baseline creation date; and
        correlating the baseline creation date to a predetermined date value associated with the longest day of the year; and
    adjusting the initial creation date of at least one of the plurality of image files based on the baseline creation date.

2. The method of claim 1, wherein the initial creation date for each of the plurality of image files is generated by a single image capture device.

3. The method of claim 1, further comprising:
    sorting the image files for each of the plurality of creation day groups into daytime image files and nighttime image files; and
    analyzing at least one of the daytime image files or the nighttime image files to determine the sunset and sunrise transition times for each of the plurality of creation day groups.

4. The method of claim 1, wherein each of the plurality of images files includes an initial creation time, the method further comprising:
    determining a baseline creation time by analyzing the plurality of image files based on their association with at least one of daytime hours or nighttime hours; and
    adjusting the initial creation time for at least one of the plurality of image files based on the baseline creation time.

5. The method of claim 4, wherein determining a baseline creation time by analyzing the plurality of image files based on their association with at least one of daytime hours or nighttime hours comprises:
    sorting the image files of at least one creation day group of the plurality of creation day groups into daytime image files and nighttime image files; and
    analyzing at least one of the daytime image tiles or the nighttime image files to determine the baseline creation time.

6. The method of claim 1, wherein correlating the baseline creation date to a predetermined date value associated with the longest day of the year comprises determining an offset value for correlating the baseline creation date to the predetermined date value.

7. The method of claim 6, wherein adjusting the initial creation date of at least one of the plurality of image files based on the baseline creation date comprises adjusting the initial creation date of at least one of the plurality of image files based on the determined offset value.

8. A method for automatically adjusting temporal creation data for a plurality of images, the method comprising:
    receiving a plurality of image files associated with the plurality of images, each of the plurality of image files including an initial creation date;
    sorting the plurality of image files into a plurality of creation day groups based on the initial creation date of each of the plurality of image files;
    analyzing the image files associated with the plurality of creation day groups to obtain daytime length information for each of the plurality of creation day groups, the daytime length information associated with a sunset transition time and a sunrise transition time for each of the plurality of creation day groups;
    analyzing the sunset and sunrise transition times to determine an average day length for each of the plurality of creation day groups;
    determining a baseline creation date based on the daytime length information by analyzing the average day length for each of the plurality of creation day groups in order to determine a baseline creation date, the analysis of the average day length comprising:
  analyzing the average day length for each of the plurality of creation day groups to determine the creation day group with the shortest average day length;
  setting the initial creation date for the creation day group with the shortest average day length as the baseline creation date; and
  correlating the baseline creation date to a predetermined date value associated with the shortest day of the year; and
adjusting the initial creation date of at least one of the plurality of image files based on the baseline creation date.

9. The method of claim 8, wherein the initial creation date for each of the plurality of image files is generated by a single image capture device.

10. The method of claim 8, further comprising:
  sorting the image files for each of the plurality of creation day groups into daytime image files and nighttime image files; and
  analyzing at least one of the daytime image files or the nighttime image files to determine the sunset and sunrise transition times for each of the plurality of creation day groups.

11. The method of claim 8, wherein each of the plurality of images files includes an initial creation time, the method further comprising:
  determining a baseline creation time by analyzing the plurality of image files based on their association with at least one of daytime hours or nighttime hours; and
  adjusting the initial creation time for at least one of the plurality of image files based on the baseline creation time.

12. The method of claim 11, wherein determining a baseline creation time by analyzing the plurality of image files based on their association with at least one of daytime hours or nighttime hours comprises:
  sorting the image files of at least one creation day group of the plurality of creation day groups into daytime image files and nighttime image files; and
  analyzing at least one of the daytime image files or the nighttime image files to determine the baseline creation time.

13. The method of claim 8, wherein correlating the baseline creation date to a predetermined date value associated with the shortest day of the year comprises determining an offset value for correlating the baseline creation date to the predetermined date value.

14. The method of claim 13, wherein adjusting the initial creation date of at least one of the plurality of image files based on the baseline creation date comprises adjusting the initial creation date of at least one of the plurality of image files based on the determined offset value.

15. A system for automatically adjusting temporal creation data for a plurality of images, the system comprising:
  one or more computing device including at least one processor and associated memory, the memory storing instructions that, when executed by the at least one processor, configure the one or more computing devices to:
    receive a plurality of image files associated with the plurality of images, each of the plurality of image files including an initial creation date;
    sort the plurality of image files into a plurality of creation day groups based on the initial creation date of each of the plurality of image files;
    analyze the image files associated with the plurality of creation day groups to obtain daytime length information for each of the plurality of creation day groups, the daytime length information associated with a sunset transition time and a sunrise transition time for each of the plurality of creation day groups;
    analyze the sunset and sunrise transition times to determine an average day length for each of the plurality of creation day groups;
    determine a baseline creation date based on the daytime length information by analyzing the average day length for each of the plurality of creation day groups in order to determine a baseline creation date, the analysis of the average day length comprising:
      analyze the average day length for each of the plurality of creation day groups to determine the creation day group with at least one of the longest average day length or the shortest average day length;
      set the initial creation date for the creation day group with the at least one of the longest average day length or the shortest average day length as the baseline creation date; and
      correlating the baseline creation date to a predetermined date value associated with at least one of the longest day or the shortest day of the year; and
    adjusting the initial creation date of at least one of the plurality of image files based on the baseline creation date.

16. The system of claim 15, wherein the initial creation date for each of the plurality of image files is generated by a single image capture device.

17. The system of claim 15, wherein the one or more computing devices are further configured to sort the image files for each of the plurality of creation day groups into daytime image files and nighttime image files and analyze at least one of the daytime image files or the nighttime image files to determine the sunset and sunrise transition times for each of the plurality of creation day groups.

18. The system of claim 15, wherein each of the plurality of images files includes an initial creation time, the one or more computing devices being further configured to determine a baseline creation time by analyzing the plurality of image files based on their association with at least one of daytime hours or nighttime hours and adjust the initial creation time for at least one of the plurality of image files based on the baseline creation time.

19. The system of claim 15, wherein the one or more computing devices are further configured to determine an offset value for correlating the baseline creation date to the predetermined date value.

20. The system of claim 19, wherein the one or more computing device are configured to adjust the initial creation date of at least one of the plurality of image files based on the baseline creation date by adjusting the initial creation date of at least one of the plurality of image files based on the determined offset value.

* * * * *